United States Patent
Park et al.

(10) Patent No.: US 8,331,283 B2
(45) Date of Patent: Dec. 11, 2012

(54) METHOD OF ALLOCATING RESOURCES USING HYBRID DUPLEXING TECHNIQUE

(75) Inventors: Seung-Young Park, Yongin-si (KR); Sang-Boh Yun, Seongnam-si (KR); Yeon-Woo Lee, Seongnam-si (KR); Chung-Gu Kang, Seoul (KR); Il-Whan Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1154 days.

(21) Appl. No.: 11/646,912

(22) Filed: Dec. 28, 2006

(65) Prior Publication Data

US 2007/0230376 A1 Oct. 4, 2007

(30) Foreign Application Priority Data

Dec. 28, 2005 (KR) .................. 10-2005-0131768

(51) Int. Cl.
*H04W 4/00* (2009.01)
(52) U.S. Cl. ....................... 370/328; 370/431
(58) Field of Classification Search .............. 370/294, 370/295, 330, 343, 345
See application file for complete search history.

(56) References Cited

U.S. PATENT DOCUMENTS

| | | | |
|---|---|---|---|
| 5,933,421 A | 8/1999 | Alamouti et al. | |
| 6,069,885 A * | 5/2000 | Fong et al. | 370/336 |
| 7,453,856 B2 * | 11/2008 | Guey | 370/336 |
| 2001/0055288 A1 * | 12/2001 | Uebayashi et al. | 370/331 |
| 2002/0105935 A1 * | 8/2002 | Miya | 370/342 |
| 2004/0165547 A1 * | 8/2004 | Lopes | 370/328 |
| 2004/0252659 A1 * | 12/2004 | Yun et al. | 370/328 |
| 2005/0141450 A1 * | 6/2005 | Carlton et al. | 370/329 |
| 2006/0077931 A1 | 4/2006 | Lee et al. | |
| 2006/0126546 A1 * | 6/2006 | Lee et al. | 370/310 |
| 2006/0126558 A1 | 6/2006 | Lee et al. | |

FOREIGN PATENT DOCUMENTS

| | | |
|---|---|---|
| KR | 1020060031927 | 4/2006 |
| KR | 1020060064926 | 6/2006 |
| KR | 1020060065304 | 6/2006 |

* cited by examiner

*Primary Examiner* — Kevin C Harper
(74) *Attorney, Agent, or Firm* — The Farrell Law Firm, P.C.

(57) ABSTRACT

A resource allocation method in a wireless communication system for providing a communication service in a given system frequency band to access terminals (ATs) within a broad-band service area around an access point (AP) and to ATs within a narrow-band service area having a radius larger than the radius of the broad-band service area. In the resource allocation method, the system frequency band is divided into a Time Division Duplexing (TDD) interval and a Frequency Division Duplexing (FDD) interval in time, and the TDD interval and the FDD interval are defined as TDD resources and FDD resources, respectively. The TDD resources are allocated to an AT within the broad-band service area, and the FDD resources are allocated to an AT within the narrow-band service area.

10 Claims, 7 Drawing Sheets

METHOD OF ALLOCATING RESOURCES USING HYBRID DUPLEXING TECHNIQUE

PRIORITY

This application claims priority under 35 U.S.C. §119 to an application filed in the Korean Intellectual Property Office on Dec. 28, 2005 and assigned Serial No. 2005-131768, the contents of which are incorporated herein by reference.

BACKGROUND OF THE INVENTION

1. Field of the Invention

The present invention relates generally to a wireless communication system, and in particular, to a multi-mode duplexing method for efficient resource management in a wireless communication system.

2. Description of the Related Art

Typically, there are two duplexing techniques: Time Division Duplexing (TDD) and Frequency Division Duplexing (FDD). In TDD, the same frequency band is divided into time slots and transmission and reception are alternately switched in time, for bi-directional communication. FDD provides bi-directional communication by dividing a given frequency band into a transmission band and a reception band.

A TDD communication system allocates time slots (or parts thereof) available to an Access Point (AP), to a user. This variable time slot allocation method enables asymmetrical communications. However, as a cell radius increases, a Round Trip Delay (RTD) increases the guard band between transmission time slots and reception time slots. As a result, transmission efficiency decreases. Accordingly, TDD is not feasible for a communication environment using a large cell radius like a macro cell. Moreover, since each cell does not use the same asymmetry rate in a multi-cell environment, serious frequency interference occurs between terminals at the boundary between neighboring cells.

An FDD communication system does not suffer a time delay in transmission or reception because a frequency band is divided for transmission and reception. Due to the absence of a time delay-caused RTD, FDD is suitable for the large cell radius environment like a macro cell. However, because of its fixed transmission and reception frequency bands, FDD is not feasible for asymmetrical transmission.

The $3^{rd}$ Generation (3G) and future-generation mobile communication systems aim at providing concurrent provisioning of multimedia services with different traffic characteristics such as broadcasting and real-time video conferencing, in addition to traditional voice service. To efficiently provide these various services, duplexing techniques which consider the asymmetry and continuity of uplink and downlink transmission according Quality of Service (QoS), have been proposed.

Figure 1:
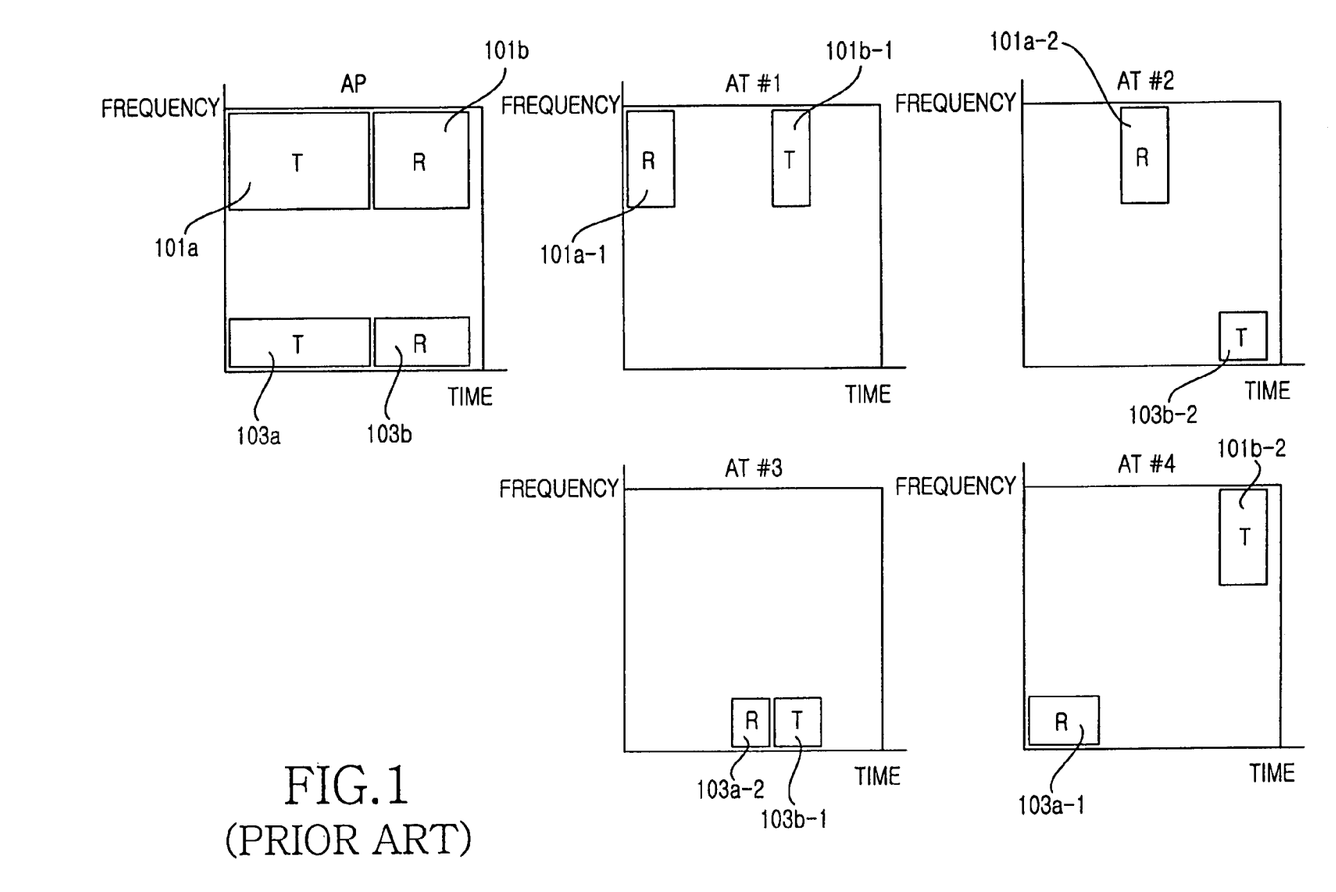
FIG. 1 illustrates graphs showing a conventional dual-band duplexing technique.

FIG. 1 illustrates a conventional dual-band duplexing technique. In the conventional dual-band duplexing technique, an AP switches between a transmission mode and a reception mode on two frequency band channels, i.e., a broadband channel and a narrow band channel every predetermined same period. Access Terminals (ATs) connected to the AP operate in the opposite mode to that of the AP and are allocated resources for reception and transmission on the two frequency band channels such that they do not overlap.

In other words, AT #1 and AT #2 occupy two equal halves of a broadband channel 101a that the AP uses in transmission mode, during reception mode intervals 101a-1 and 101a-2, respectively. AT #3 and AT #4 partially occupy a narrow band channel 103a that the AP uses for transmission, during reception mode intervals 103a-2 and 103a-1, respectively. AT #1 and AT #4 occupy part of a broadband channel 101b that the AP uses in reception mode, during transmission mode intervals 101b-1 and 101b-2, respectively. AT #2 and AT #3 partially occupy a narrow band channel 103b that the AP uses for reception, during transmission mode intervals 103b-2 and 103b-1, respectively.

This dual-band duplexing technique suffers loss of the symmetry between uplink and downlink channels due to switching between bands. Also, it is difficult to control uplink and downlink resource rates according to traffic condition, and a multi-mode MODEM is required to support a plurality of bands, thereby increasing a terminal's manufacturing cost.

Figure 2:
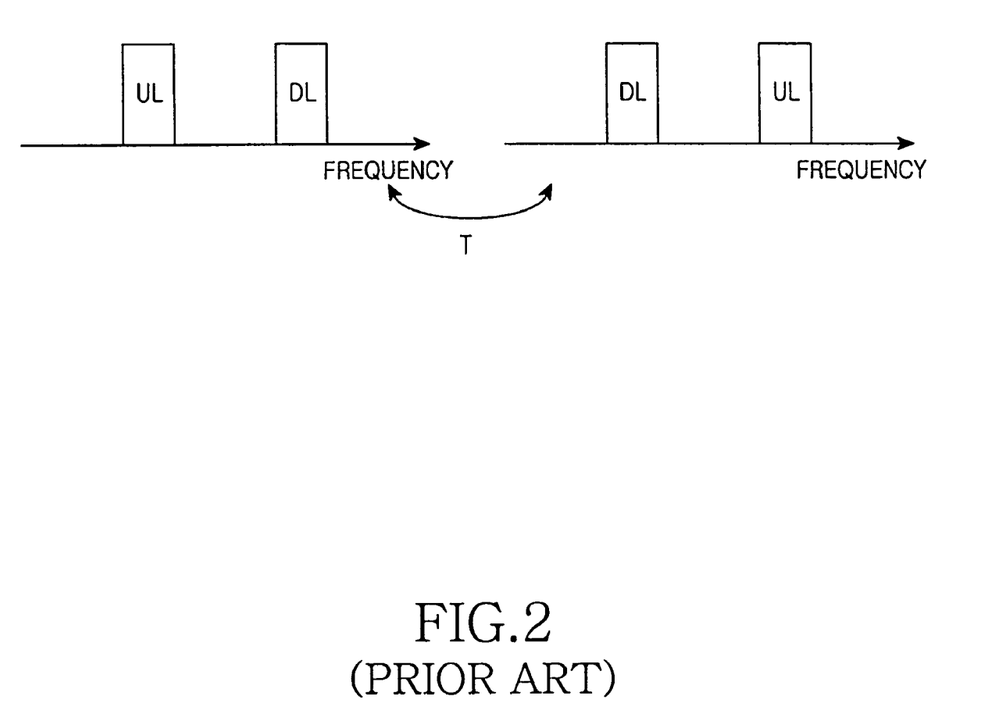
FIG. 2 illustrates graphs showing a conventional band-switching duplexing technique.

FIG. 2 illustrates a band switching duplexing technique. The uplink and downlink are switched in one band every predetermined period T (sec). Alongside TDD channel switching, different bands are used for the uplink and downlink, simultaneously.

However, the use of the same-band channels decreases flexibility of resource allocation (i.e. control of uplink and downlink resource rates) and channels are periodically switched. Therefore, asymmetric transmission is difficult to implement.

SUMMARY OF THE INVENTION

An object of the present invention is to substantially solve at least the above problems and/or disadvantages and to provide at least the advantages below. Accordingly, the present invention provides a hybrid duplexing method for enabling efficient resource management by flexibly controlling uplink and downlink resource allocation according to a communication environment.

The present invention provides a hybrid duplexing method for maximizing system throughput by appropriate selective use of TDD and FDD according to uplink and downlink traffic characteristics in each cell.

The present invention provides a hybrid duplexing method for achieving the advantages of both TDD and FDD, i.e., broadband transmission and continuity by allocating resources to ATs near to an AP in TDD and to ATs at a cell boundary in FDD.

According to one aspect of the present invention, in a resource allocation method in a wireless communication system for providing a communication service in a given system frequency band to access terminals within a broad-band service area around an access point and to access terminals within a narrow-band service area having a radius larger than the radius of the broad-band service area, the system frequency band is divided into a TDD interval and an FDD interval in time, and the TDD interval and the FDD interval are defined as TDD resources and FDD resources, respectively. The TDD resources are allocated to an access terminal within the broadband service area, and the FDD resources are allocated to an access terminal within the narrow-band service area.

It is preferred that in the TDD and FDD resources defining step, odd-numbered TDD resources are set as downlink TDD resources and even-numbered TDD resources are set as uplink TDD resources.

It is preferred that in the TDD and FDD resources defining step, the FDD resources are divided in frequency into a plurality of downlink channels and a plurality of uplink channels.

It is preferred that in the FDD resource allocating step, at least one downlink channel, at least one uplink channel, or at least one uplink and downlink channels are allocated, the at least one uplink and downlink channels not being in use for a neighbor cell.

According to another aspect of the present invention, in the TDD and FDD resources defining step, the TDD resources are divided in frequency into downlink TDD resources and uplink TDD resources, the FDD resources are divided in frequency into downlink FDD resources and uplink FDD resources, the downlink FDD resources are divided in frequency into a plurality of downlink channels, and the uplink FDD resources are divided in frequency into a plurality of uplink channels.

According a further aspect of the present invention, in the TDD and FDD resources defining step, the TDD resources are divided in time into downlink TDD resources and uplink TDD resources, the FDD resources are divided in frequency into downlink FDD resources and uplink FDD resources, the downlink FDD resources are divided in frequency into a plurality of downlink channels, and the uplink FDD resources are divided in frequency into a plurality of uplink channels.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 3:
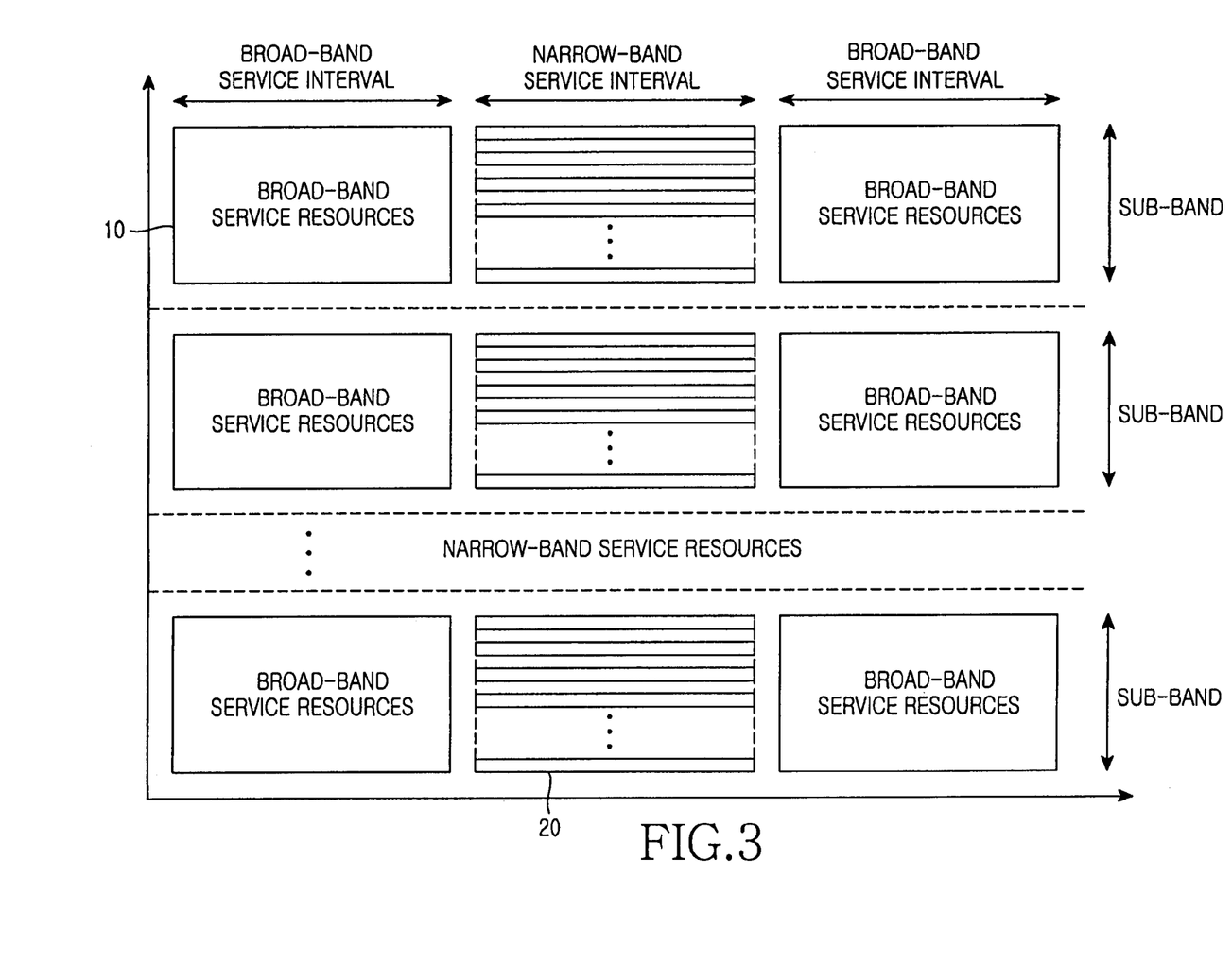
FIG. 3 is a graph illustrating a resource dividing method in a hybrid duplexing method according to the present invention.

FIG. 3 is a graph conceptually illustrating a resource dividing method in a hybrid duplexing method according to the present invention.

Referring to FIG. 3, a given system frequency band is divided into a plurality of sub-bands, each sub-band being divided in time into a broad-band service interval and a narrow-band service interval. The broad-band service interval is allocated to nearby ATs to provide a broad-band service, and the narrow-band service interval is in turn branched into a plurality of channels in frequency, for allocation to remote ATs to provide a narrow-band service. For notational simplicity, a block defined by the bandwidth of each sub-band and its broad-band service interval is called broad-band resources 10 and a block defined by the bandwidth of each sub-band and its narrow-band service interval is called narrow-band resources 20.

Figure 4:
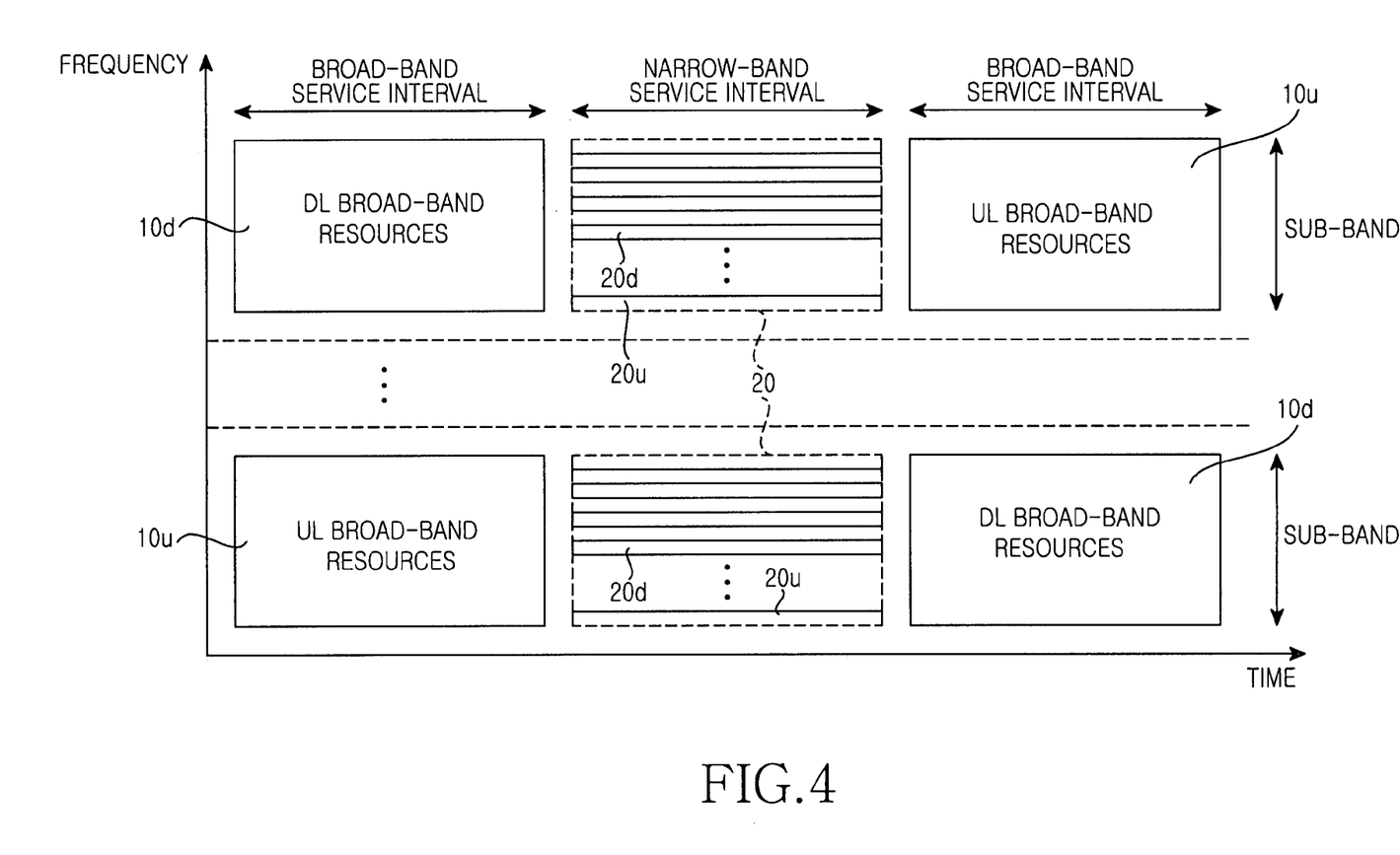
FIG. 4 is a graph illustrating a hybrid duplexing method according to a first embodiment of the present invention.

FIG. 4 is a graph illustrating a hybrid duplexing method according to a first embodiment of the present invention. The broad-band resources 10 of FIG. 3 are divided into downlink (DL) broad-band resources 10d and uplink (UL) broad-band resources 10u, which alternate with each other in time, and generates differently in a frequency domain from those of a neighboring sub-band. The narrow-band resources 20 of FIG. 3 are divided into a plurality of downlink narrow-band channels 20d and uplink narrow-band channels 20u in the same time interval. Since the downlink and uplink broad-band resources 10d and 10u alternate with each other, the broad-band service has constant reciprocity. Compared to the narrow-band resources, the broad-band resources do not need a guard band to distinguish channels. Hence, resources are saved.

Figure 5A:
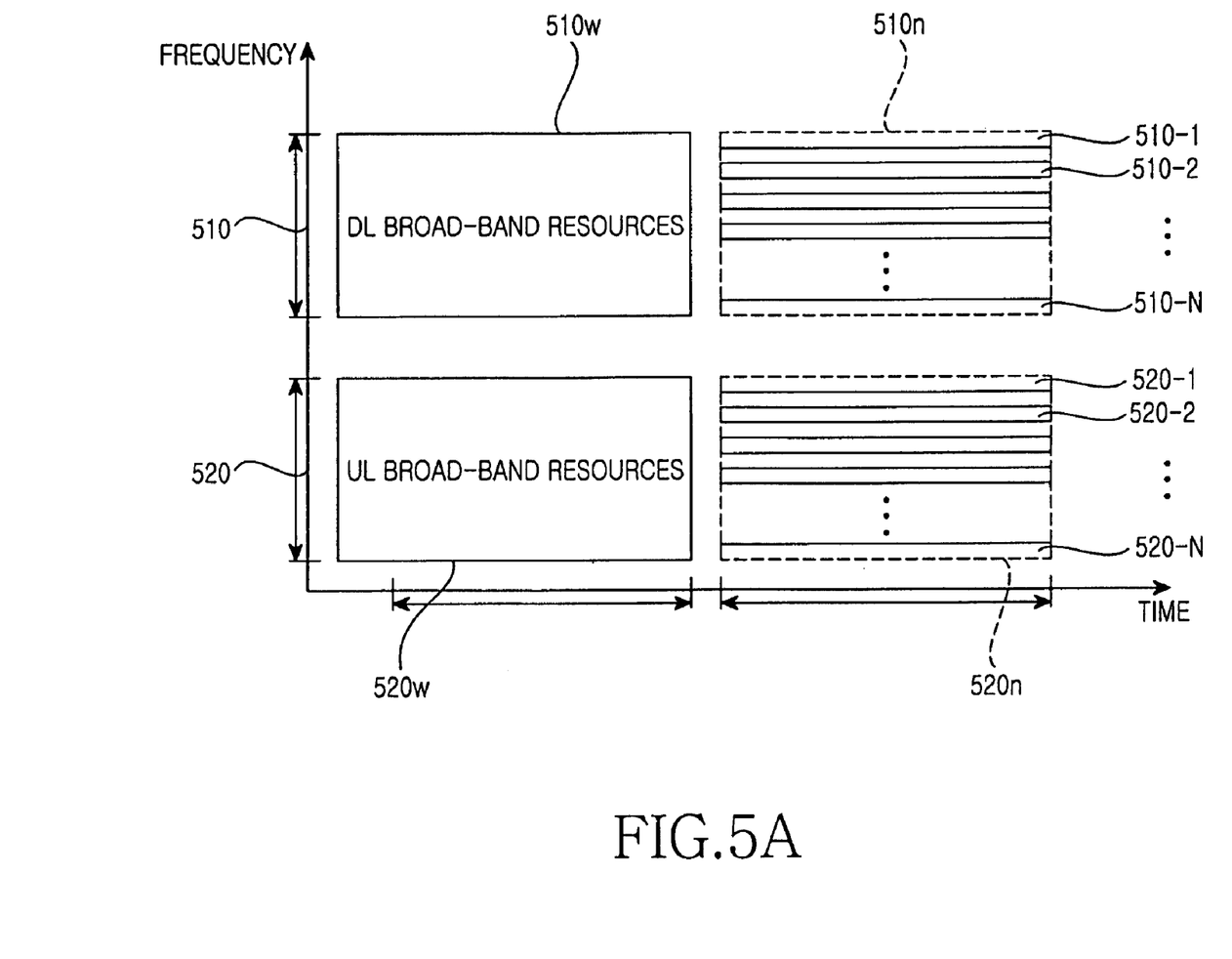
FIG. 5A is a graph illustrating a hybrid duplexing method according to a second embodiment of the present invention.

FIG. 5A is a graph illustrating a hybrid duplexing method according to a second embodiment of the present invention. A given system frequency band can be divided in frequency into a downlink band 510 and an uplink band 520. Each sub-band is divided in time into a broad-band interval 501 and a narrow-band interval 502.

According to of the present invention, a block defined by the downlink band 510 and the broad-band interval 501 is called downlink broad-band resources 510w, and a block defined by the downlink band 510 and the narrow-band interval 502 is called downlink narrow-band resources 510n. A block defined by the uplink band 520 and the broad-band interval 501 is called uplink broad-band resources 520w, and a block defined by the uplink band 520 and the narrow-band interval 502 is called uplink narrow-band resources 520n.

The downlink narrow-band resources 510n and the uplink narrow-band resources 520n are in turn respectively divided into N downlink narrow-band channels 510-1 to 510-N, and N uplink narrow-band channels 520-1 to 520-N, in frequency.

The downlink and uplink broad-band resources 510w and 520w are allocated to ATs in close proximity with (i.e., near to) an AP during the broad-band interval 501, and the downlink and uplink narrow-band resources 510n and 520n are allocated to ATs far from the AP during the narrow-band interval 501.

Figure 5B:
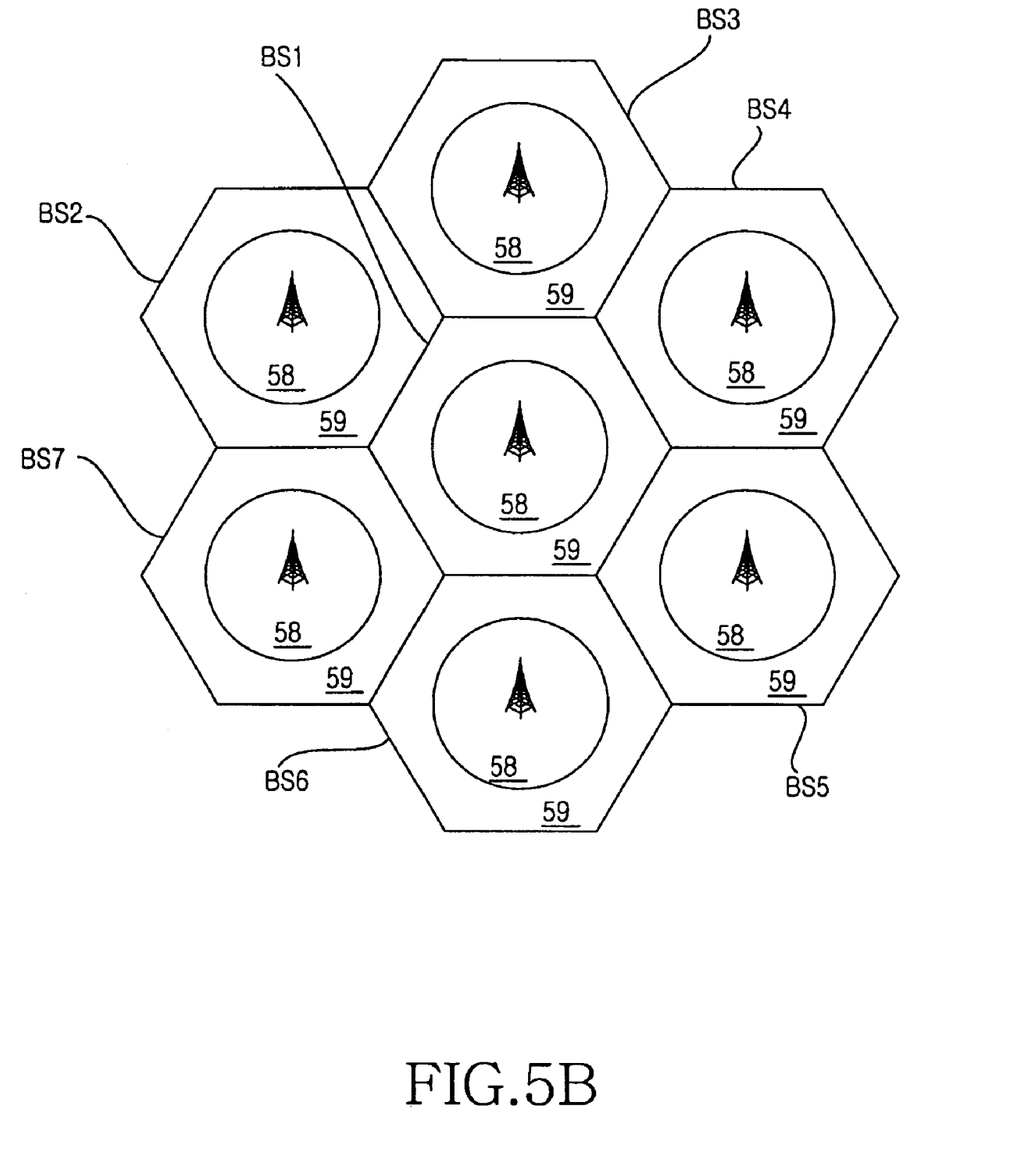
FIG. 5B is a diagram illustrating the cell configuration of a communication system to which the hybrid duplexing method illustrated in FIG. 5A is applied.

FIG. 5B is a diagram illustrating the cell configuration of a communication system using the hybrid duplexing method illustrated in FIG. 5A.

Referring to FIG. 5B, seven cells 51 to 57 form one cluster. Each cell is divided into a broad-band service area 58 and a narrow-band service area 59 situated about a BS BS1-7 located in each of the seven cells 51-57. The radius of the broad-band service area 58 is smaller than that of the narrow-band service area 59.

MSs located within the broad-band service area 58 are allocated the downlink and uplink broad-band resources 510w and 520w of FIG. 5A. Since the broad-band service areas of adjacent cells are located at a sufficient distance from each other, they do not interfere with each another despite the use of the same broad-band resources 510w and 520w during the same broad-band interval.

Meanwhile, ATs within the narrow-band service area 59 are allocated available narrow-band channels among the downlink narrow-band channels 510-1 to 510-N of the downlink narrow-band resources 510n of FIG. 5 and the uplink narrow-band channels 520-1 to 520-N of the uplink narrow-band resources 520n of FIG. 5.

Each BS that manages its cell shares channel use information with its neighbor BSs, so that it can allocate uplink and downlink narrow-band channels not in use for the neighbor cells. Therefore, inter-cell interference is avoided in the narrow-band service area 59.

For example, in case where a cell 51 at the center of the cluster allocates resources to an AT within its narrow-band service area 58, if the neighbor cells 52 to 57 use the downlink narrow-band channels 510-2 to 510-7 and the uplink narrow-band channels 520-1 to 520-7 during the narrow-band-interval 502, the cell 51 allocates uplink and downlink narrow-band channels among the remaining channels to the MS.

Figure 6:
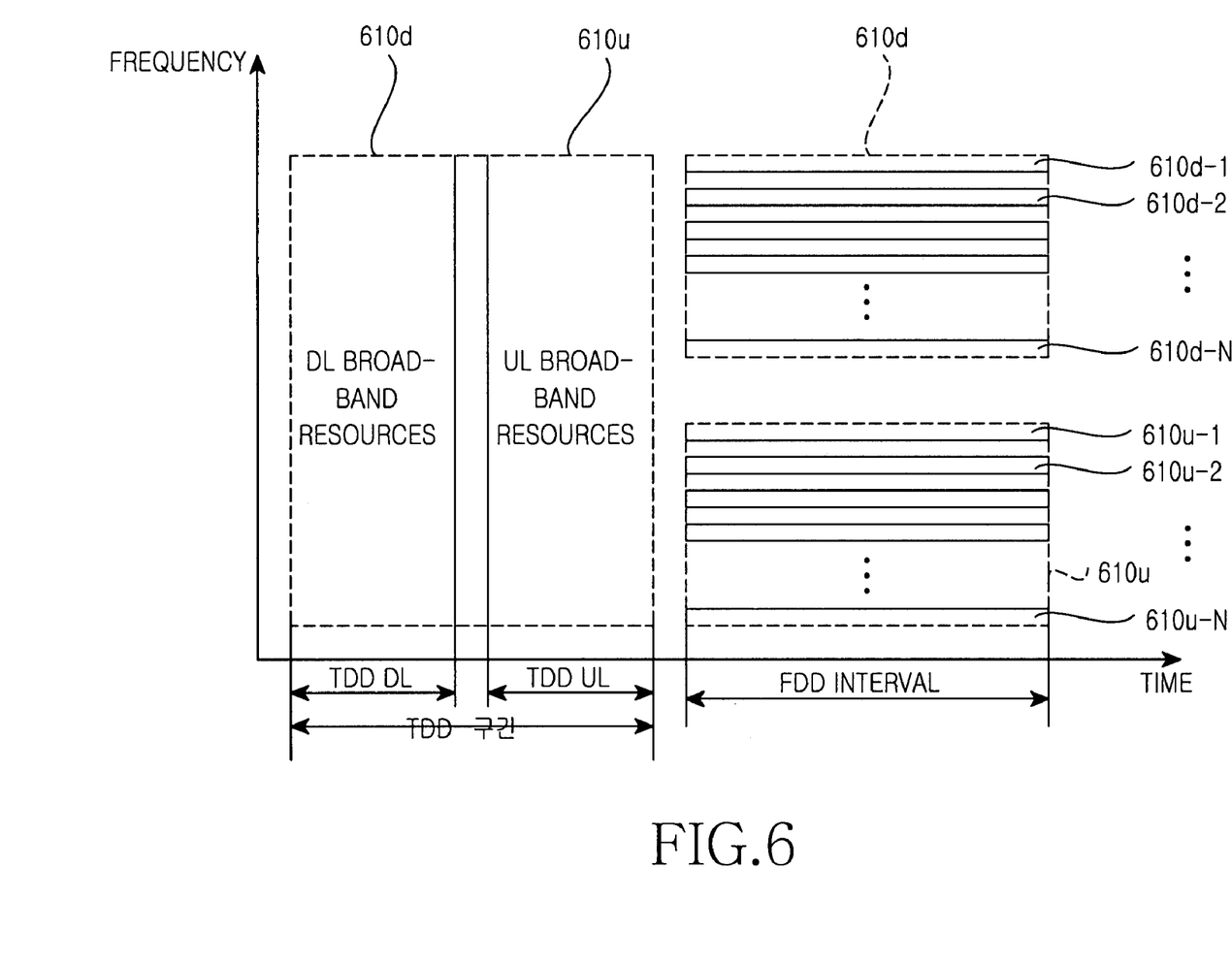
FIG. 6 is a graph illustrating a hybrid duplexing method according to a third embodiment of the present invention.

FIG. 6 is a graph illustrating a hybrid duplexing method according to a third embodiment of the present invention. System resources can be divided in time into a TDD interval and an FDD interval and the TDD interval is in turn divided in time into a downlink TDD interval and an uplink TDD interval. The FDD interval is divided in frequency into a downlink FDD band and an uplink FDD band. The downlink and uplink FDD bands are further divided into downlink FDD narrow-band channels 610*d*-1 to 610*d*-N and uplink FDD narrow-band channels 610*u*-1 to 610*u*-N.

Downlink broad-band resources 610*d* defined by the system frequency band and the downlink TDD interval and uplink broad-band resources 610*u* defined by the system frequency band and the uplink TDD interval are allocated to ATs within the broad-band service area 58 of each cell illustrated in FIG. 5B to provide the broad-band service. The downlink narrow-band resources 610*d* defined by the downlink FDD band and the downlink FDD interval and the uplink narrow-band resources 610*u* defined by the uplink FDD band and the uplink FDD interval are allocated to ATs within the narrow-band service area 59 of each cell illustrated in FIG. 5B to provide the narrow-band service. Needless to say, the downlink and uplink narrow-band resources 610*d* and 610*u* are allocated on a downlink and uplink narrow-band channel basis in such a manner that the downlink and uplink narrow-band channels do not overlap with those of a neighbor cell.

While the TDD interval and the FDD interval are symmetrical in the embodiments of the present invention, they can be set asymmetrically according to a system environment or a traffic environment and it is also possible to control the number of TDD or FDD intervals in a unit time. Furthermore, broad-band resources allocated in TDD can be further time-divided or frequency-divided when needed. Regarding narrow-band resources allocated in FDD, the number of channels to be allocated can be controlled according to channel quality and a required number.

As described above, the hybrid duplexing method of the present invention allocates resources in TDD and FDD in combination, taking into account a communication environment. Therefore, QoS is guaranteed and resources are efficiently managed, as well.

In addition, the radius of a TDD-based broad-band service area is restricted and channel information is shared with a neighbor cell. Hence, channels of an FDD-based narrow-band service area are allocated, not overlapping with those of neighbor cells. Consequently, inter-cell interference is prevented.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for allocating resources in a wireless communication system, comprising the steps of:
   allocating, to first access terminals located within a first area, first resources divided into an uplink resource and a downlink resource in a time region; the first resources having a predetermined time interval being allocated in the time region, and
   allocating, to second access terminals located within a second area, second resources in the predetermined time interval located between the uplink resource and the downlink resource in the time region, wherein the second resources are divided into an uplink resource and a downlink resource in a frequency region.

2. The method of claim 1, wherein the uplink resource and the downlink resource in the time region are allocated using different sub-bands allocated in neighbor cells.

3. The method of claim 1, wherein the second resources comprise a plurality of sub-channels, and guard intervals are set between sub-channels.

4. The method of claim 3, wherein allocating the second resource comprises:
   allocating one of remaining sub-channels, when sub-channels used in neighbor cells are excluded from among the plurality of sub-channels, to the second access terminals.

5. The method of claim 1, wherein the first area is a center area that is determined based on a threshold within a service coverage in each cell, and the second area is an edge area that is determined based on the threshold.

6. An apparatus for allocating resources in a wireless communication system,
   wherein the apparatus allocates, to first access terminals located within a first area, first resources divided into an uplink resource and a downlink resource in a time region, the first resources having a predetermined time interval being allocated in the time region; and
   allocates, to second access terminals located within a second area, second resources in the predetermined time interval located between the uplink resource and the downlink resource in the time region, wherein the second resources are divided into an uplink resource and a downlink resource in a frequency region.

7. The apparatus of claim 6, wherein the uplink resource and the downlink resource in the time region are allocated using different sub-bands allocated in neighbor cells.

8. The apparatus of claim 6, wherein the second resources comprise a plurality of sub-channels, and guard intervals are set between sub-channels.

9. The apparatus of claim 8, wherein the apparatus allocates one of remaining sub-channels, when sub-channels used in neighbor cells are excluded from among the plurality of sub-channels, to the second access terminals.

10. The apparatus of claim 6, wherein the first area is a center area that is determined based on a threshold within a service coverage in each cell, and the second area is an edge area that is determined based on the threshold.

* * * * *